Nov. 13, 1956     H. T. STEVINSON     2,770,432
PARACHUTE WITH ROTATING CANOPY
Filed Nov. 9, 1953     3 Sheets-Sheet 3
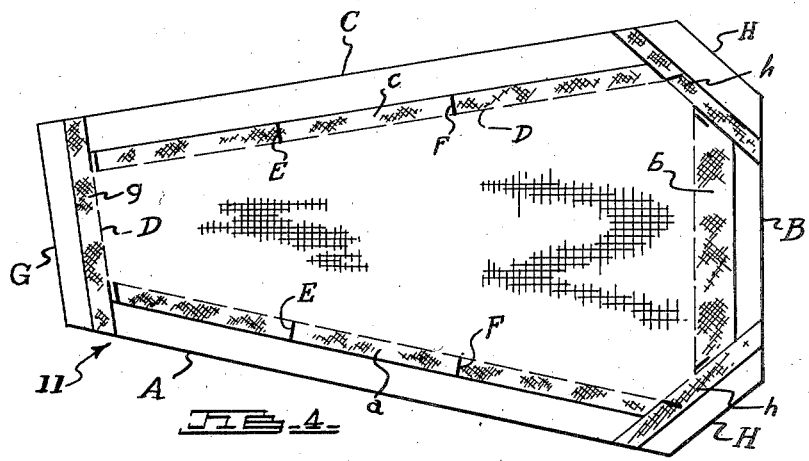
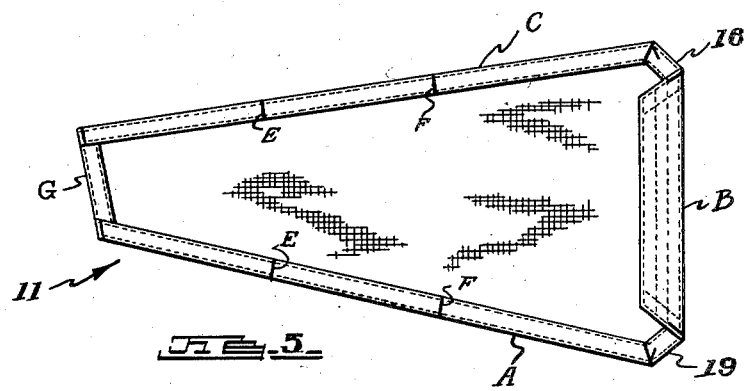
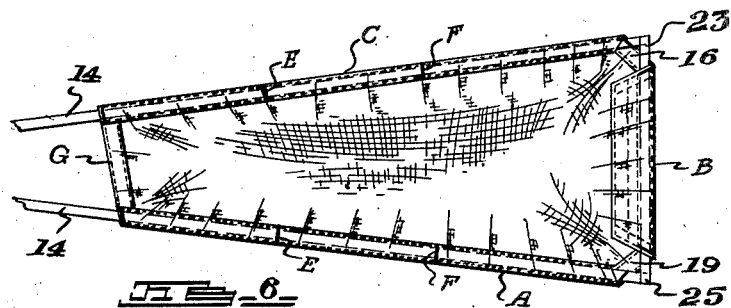
INVENTOR.
HARRY T. STEVINSON
BY Smart & Biggar
ATTORNEYS

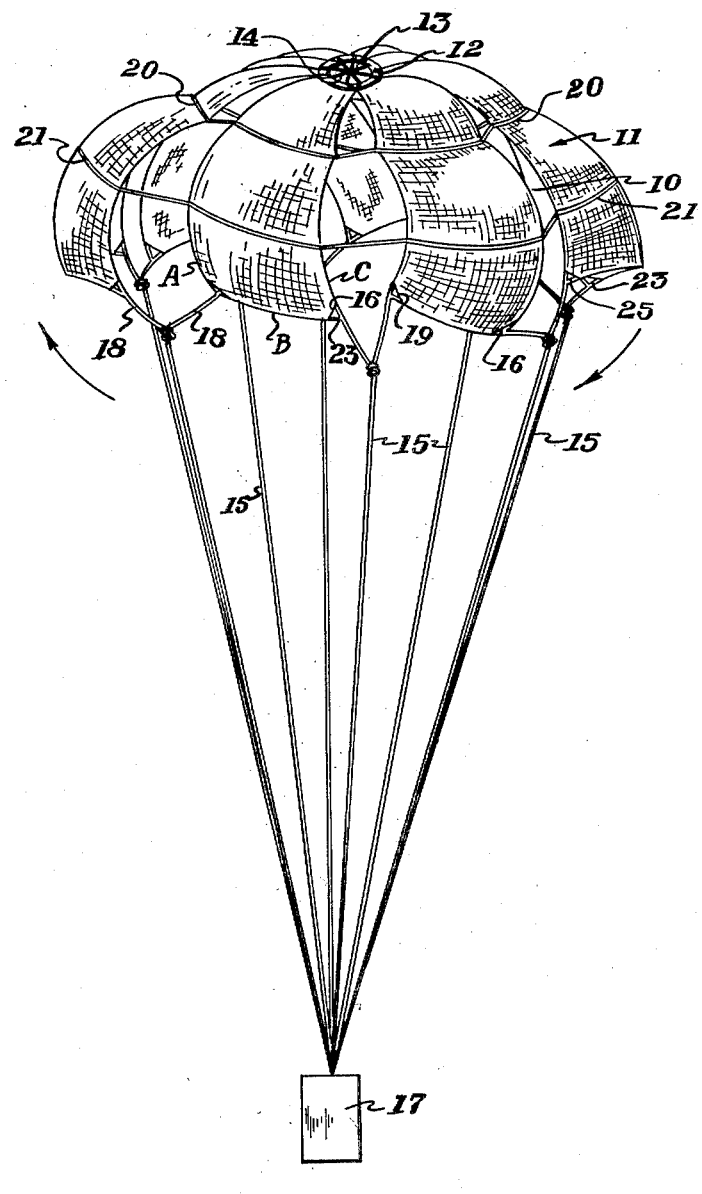

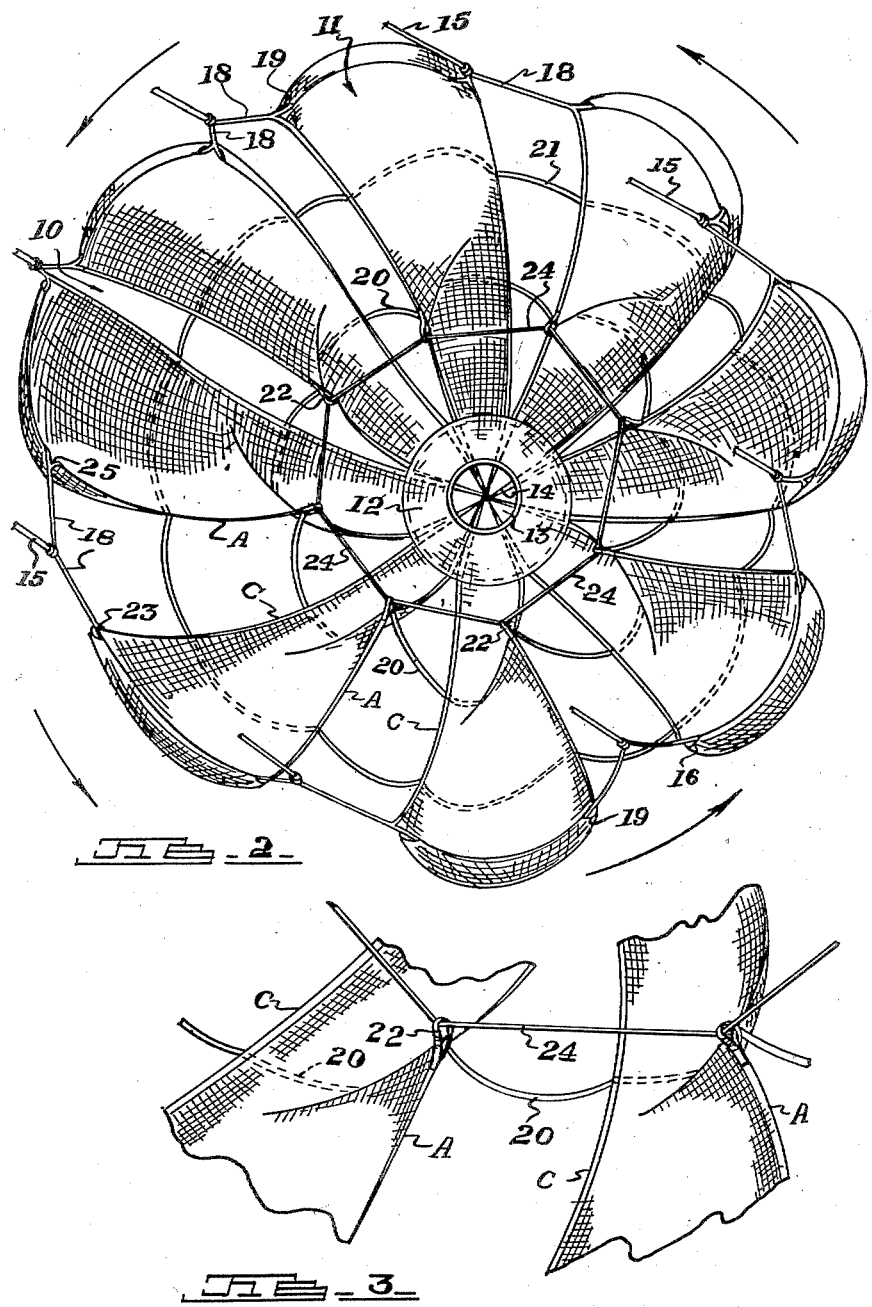

United States Patent Office 2,770,432
Patented Nov. 13, 1956

2,770,432
PARACHUTE WITH ROTATING CANOPY

Harry Thompson Stevinson, Uplands, Ontario, Canada, assignor to The National Research Council, Ottawa, Ontario, Canada, a corporation of Canada Application November 9, 1953, Serial No. 391,019

Claims priority, application Great Britain November 10, 1952

11 Claims. (Cl. 244—145)

This invention relates to a parachute which rotates in flight and in some embodiments can automatically open, close and re-open in flight in a usefully controllable manner.

Although the invention is described in this specification with reference to parachutes for the dropping of objects such, for example, as supplies, it is understood that by reason of the new principle involved, the invention may offer advantages in many fields.

As is well known, there are several important difficulties involved in the dropping of supplies by parachute, the principal ones being aiming errors, inaccuracy in flight, damage on landing, and both damage and inaccuracy due to dragging of supplies along the ground. At present it is usual, in order to prevent the dragging of supplies along the ground, to provide a separate disconnecting gear which is generally either unreliable or is complicated, heavy and expensive.

An object of the invention is to provide a parachute which overcomes these and other important difficulties of the known parachutes. Thus there is provided according to the invention a parachute for inanimate objects, in which the canopy is connected through the shroud lines to the load in such manner that torque developed at the load end of the shroud lines is transmitted to the load during at least part of the flight of the parachute, and the canopy is formed of a plurality of tiltable spaced gores, whereby in flight air trapped by the canopy passes between adjacent gore edges and the canopy is rotated in a direction depending on the tilting of the gores. The result is to spin the load in a manner similar to a bullet in flight.

Because of the large relative amount of inertia of the load, the load commences to rotate in a sluggish manner. If the moment of inertia of the load is above a minimum, according to some embodiments of the invention, the shroud lines are wound up enough to collapse the parachute. The system then drops more rapidly and substantially straight down. When the parachute collapses it commences to rotate in the opposite sense very slowly. The load continues to rotate as before. Thus the shroud lines gradually untwist until the parachute re-opens and retards the system for a gentle landing. This action so improves the ballistics and minimizes the effect of wind drift and skid as to result in accuracy heretofore thought impossible of attainment.

Immediately after release from an aircraft in flight, a standard parachute on opening decelerates the load and steepens its trajectory, but it remains subject to drift as the air mass speeds over the earth. It the whole air mass is drifting at the existing wind speed the aircraft and supplies drift with it. The amount of drift is proportional to the wind speed and time of fall. Thus, shortening the time of fall reduces the amount of drift. Drift can be allowed for in aiming if the wind speed and time of fall are known. However, the normal case is that the aimer knows only the wind speed at his own altitude, as it was when he last measured it. Clearly then a parachute that remains open during the whole drop will land off the target by an amount depending on (a) The rates at which the wind velocity changes with altitude and time,
(b) The amount of time between wind determination and the drop,
(c) The duration of the fall,
(d) A ballistic error caused by aerodynamic side forces on the load when it oscillates and another caused by the parachute gliding sideways if any tilt exists, at the canopy, and
(e) Aiming errors.

The parachute according to the invention minimizes several of these effects while at the same time providing automatic functions after landing. It reduces change in drift rate because the collapsed parachute and load drop quickly through the middle levels of air, leaving little time for the side forces caused by differing wind velocities to act and alter the drift rate. By opening only at the last instant before landing, change of drift rate in the lower level air is maintained small. Thus the wind speed at flight level can be used for aiming purposes. It is important to note that standard parachutes must be dropped from accurately known altitudes if accuracy is attempted because wind drift must be allowed for. Thus no added operational requirement exists with the "cycling parachute" of the present invention.

Gliding sideways is eliminated because the rotational speed imparts a high degree of gyro stability to the system so that the load does not swing from side to side causing gliding, even in turbulent air. Also, the effect of any asymmetry of canopy construction is distributed equally in all directions so that gliding from this cause is eliminated.

Another result of this gyro stability is that the load lands more nearly vertical. With standard parachutes, in rough air violent activity of the load occurs. Damage to the sides of a cylindrical load container often results because it strikes the ground at a large angle. With modern dropping speeds up to several feet of crash nose is required to absorb the shock. The sides of the container should be similarly constructed. This, however, presents an immense stowage problem in an aircraft which is avoided according to the invention because the gyro stability mentioned causes the load to land more nearly vertical. In the presence of a large wind drift the gyro effect resists toppling, and almost eliminates the practical need to cushion the sides of the load.

When the load strikes the ground there is, as mentioned above, no need for a mechancal disconnecting device to prevent the load being dragged along the ground. If there is a wind tending to blow the parachute along the ground, the shrouds quickly wind up and the parachute collapses, the load being held against rotation by contact with the ground. Eliminating the heavy disconnecting gear is vitally important because weight in the tail of a container drastically decreases its stability in flight before the parachute opens.

An embodiment of the invention is illustrated in the attached drawing, in which:

Figure 1 is a perspective view of a parachute according to the invention,

Figure 2 is a perspective view from the underside of the inflated canopy in flight, the shroud lines being broken away, Figure 3 is an enlarged fragmentary view illustrating the connection of the inner ring, Figure 4 is a plan view of a gore showing the blank prior to sewing, and showing the stiffening tapes in position, Figure 5 is a plan view of the gore after folding and sewing to form channels for reception of the reinforcing tape, and Figure 6 is a plan view of the shirred gore showing the reinforcing tape sewn in position.

Referring to Figures 1 and 2, it will be seen that the canopy is formed with open slots 10 between the gores 11 which are connected at the top centre of the canopy by a ring 12 formed with a vent 13. Thus, the canopy is broken up into a number of separated gores which act as vanes in the manner described below so as to cause the canopy to rotate. As is well known, the porosity of the fabric of which the conventional parachute canopy is made has an important effect on the critical opening speed of the parachute, i. e., the speed beyond which the parachute will not open. The same considerations as to porosity in relation to dimensions apply in the case of the parachute according to the invention and accordingly, in order to compensate for the effect of the slots 10, the material from which each gore is cut is much less porous (see the table given below) than that used in a conventional parachute of equivalent size designed for a similar critical opening speed. Each gore is cut from a suitable fabric such as that sold as "Nylon taffeta" under the trade mark Nylon. For reinforcement and porosity control purposes it is desirable in effect to provide each gore with a framework of tape 14 folded into the edges A, B and C of each gore and sewn with the material shirred in the manner which is well known in the manufacture of parachutes, particularly those designed for high speed dropping, in order to reduce the longitudinal stresses in the gores. The extent of shirring and whether any shirring at all is required depends, in any particular parachute according to the invention, on the maximum forward speed, and on the load to be dropped, and whether the parachute is designed simply to spin on opening with the advantages referred to above or whether it is designed to cycle so as to follow the second mode or the third mode referred to below. For convenience a parachute designed to collapse is referred to herein as a "cycling" parachute because it goes through at least one cycle consisting of collapse and re-open. In the case of a cycling parachute it has been found that shirring of about 10% in sides A and C and about 28% in side B is desirable for the best collapse and re-open behaviour.

The reinforcing tapes 14 coming from the inner ends of sides A and C of a gore are secured to those of the diametrically opposite gore across the vent 13. At each outside corner of each gore there is connected one end of a length of tape forming a stirrup 18 which is lapped and sewn to the loop 23 formed in tape 14 at the corner 16 of one gore and to the loop 25 formed in tape 14 at the corner 19 of the adjacent gore. A six-cord shroud 15 is then attached to the stirrup 18 between each pair of gores in the manner referred to below, and is attached to the load 17 in such manner that twisting of the shroud lines applies torsion to the load 17. Tape ring 20 is sewn to one face of each gore about two-thirds of the way in from the corner 16. This ring goes all the way around the canopy to provide strength and to space the gores by what is in effect a strap. A loop of tape 22 is sewn on edge A of each gore at the location of ring 20. Another tape ring 24 constituting an "inner ring" is passed through each of the loops 22 of the gores, for the purposes of tilting the gore vanes on inflation of the canopy and spacing of the gores. The cords and tapes 14, 15, 18, 20 and 24 are preferably formed of Nylon.

When the parachute is released from an aircraft a standard pilot parachute pulls out the roll pack and parachute from the load, so that the parachute is left squidded out behind the load (the pilot chute and roll pack falling free). The shroud line cords are each attached to a stirrup 18, e. g. by a suitable knot, at a point in the length of the stirrup such that when the canopy is in the squidded condition the shroud lines pull on the edges C. Thus in the squidded condition, the edges C (which in the illustrated embodiment are longer than edges A) are taut, while the edges A are slack. However, as air is captured by the parachute and the canopy inflates, the inner ring 24 becomes taut, holding all of the edges A inwardly at edges C, making air spill from the edge C of each gore. As a result the parachute begins to spin in the direction indicated by the arrow in Figure 1. Once the parachute is open, the slant of the gores now serving as vanes is determined substantially by the length of the inner ring 24, the portion of the ring 20 interconnecting the edge A of one gore and the edge C of the next gore, and by the relative length of the edges A and C, these factors also having an important effect on the opening of the parachute. It has been found that a second ring 21, corresponding to ring 20, may advantageously be provided at approximately two-fifths of the way between ring 20 and the outer end B of each gore.

In the construction of a gore 11 it is convenient to use two templates, a larger one for cutting the fabric blank illustrated in Figure 4 and a smaller template for marking on the blank the non-shirred gore periphery and the locations at which the tape rings 20 and 21 are to be sewn. The marking of the non-shirred periphery is indicated by the line D in Figure 4 and the marks for the sewing of tape ring 20 are shown at E while the markings for the tape ring 21 are shown at F. The dimensions of the gore sides and the distances between E and F and between E and the apex end G and between F and the corner H along either edge of the gore vary according to the size of the parachute, but the proportions are maintained as illustrated in Figure 4. As a result the tapes 20 and 21 divide the gore into three sections none of which is elongated but which each has four sides of a length which is of the same order. Referring to Figure 4 the unshirred distances along side A from G to E, E to F and F to H are in the embodiment illustrated respectively 11¼", 10¾" and 13¼" and the corresponding distances along edge C are respectively 11¾", 10¾" and 13⅝". B is 17¼" long, G is 6⅝" and each corner H is 2¼". The angle subtended by A and H and by C and H is 150°, the angle subtended by C and G is 92.7° and the angle subtended by A and G is 111.6°.

A 4" margin is allowed at edge B forming the gore mouth for the folding of the fabric and a 3" margin is allowed at edges A, C, G and H. In order to facilitate the folding of the edges and also for stiffening and porosity control purposes, stiffening tapes $a$, $b$, $c$, $g$ and $h$ are laid on the margins along A, B, C, G and H respectively as illustrated in Figure 4. Stiffening tape $b$ is 2½" wide whereas the remainder are 1" wide. The margins are folded over the stiffening tapes and sewn as illustrated in Figure 6 to define a channel along each of edges A, B and C adapted to receive a reinforcing tape 14 threaded into the channels as illustrated in Figure 6. At corners H, the reinforcing tape 14 extends beyond the fabric and is folded to form loops 23 and 25 at the corners 16 and 19 respectively as described above, whereas the free ends of the tape 14 are secured to those of the diametrically opposite gore across the vent 13.

When the reinforcing tape 14 has been thus positioned the fabric is shirred as required and the tape 14 is sewn to the fabric at intervals along the edges A, B, and C so that the tape 14 holds the fabric in the shirred condition. The consequent reduction in the gore dimensions appears from Figure 5. The distances G to E, E to F and F to H along A thus become in the embodiment illustrated with 10% shirring, 10⅛", 9¹¹⁄₁₆" and 12" respectively and these distances along C become 10⁹⁄₁₆", 9¹¹⁄₁₆" and 12⁹⁄₁₆" respectively. Shirring of B by 28% reduces it to 12½".

A parachute constructed according to the invention may be designed to perform in three principal modes. Firstly, it may simply open and spin without collapsing. This leads to the important advantage of gyro stability in flight and landing, freedom from skid as mentioned above and automatic collapse on the ground. Secondly, the characteristics of the parachute and load may be so adjusted that the parachute when opened twists up the shroud lines sufficiently to collapse and then the parachute re-opens and stays open. Thirdly, the adjustment may be such that the parachute continues to collapse and re-open several times. It will be appreciated that in general the third mode of performance is almost as desirable as the second mode so long as the height from which a drop is made is so determined that the parachute is closed for a sufficient portion of the drop and is re-opened just before it reaches the ground. Further, it will be seen that in any of these modes, opening may be delayed by releasing the parachute with twist in the shroud lines.

As the parachute spins, it twists the shroud lines 15 and the torque impulse thus applied to the load starts it spinning. Due to its moment of inertia, however, the load 17 does not, at least initially, spin as quickly as the parachute, the speed of rotation of which is controlled by its own effective pitch and forward velocity in the air, so that the shroud lines are twisted up to some extent at least. The number of twists required to cause collapse is controlled by a large number of important variables, for example, length, diameter, and number of shrouds, radius and effective porosity of the canopy, aerodynamic load distribution along the gores, forward and rotational velocities of the canopy, and mass of the canopy and shrouds.

If the characteristics of a parachute according to the invention are such in relation the load inertia that the shrouds are not twisted sufficiently for collapse, the parachute performs in the first mode. In the case, however, of mode 2 or 3 there is at least one collapse so that the canopy goes through at least one cycle of collapse and reopening. The single collapse mode is recommended for practical dropping if the flight altitude warrants collapse. If dropping is from very low altitude, little is gained by collapse. In this case the no-collapse mode is recommended so that advantage can be taken of the straight flight, gyro stability and automatic collapse on landing provided by this parachute. Greater tolerance on load inertia results in the no-collapse mode because the inner ring can be set large so that collapse cannot occur.

During each open phase of the canopy a definite torque impulse is applied to the load, so that a definite increase in its rotational speed results. During each closed phase of the canopy the torque applied to the load is small and opposes the small effect of the aerodynamic torque, retarding rotation. Thus the load may normally be considered to coast at a constant rotational speed while the canopy is collapsed. For any given load inertia the parachute must continue to cycle until the load speed of rotation is raised to approximately the same value as that of the canopy. Once this condition is reached the canopy cannot normally overrun the load enough to twist up the shrouds for collapse to occur. In the case of mode 2, this condition is reached after one collapse, and in the case of mode 3 it is not reached before the system reaches the ground.

Re-opening of the parachute after collapse is effected by the untwisting of the shroud lines until a point is reached where the component of force in the twisted shroud lines acting inward is overcome by the aerodynamic forces acting outward and the parachute inflates. The continued rotation of the load after collapse serves to unwind the shroud lines and successful tests have been carried out with parachutes designed and operated on this basis. It is preferred, however, positively to rotate the canopy in the reverse direction after collapse, and this is done in the case of the embodiment of the invention which is illustrated. In order to understand the manner in which the illustrated parachute reverses direction on collapse, so as to unwind the shroud lines, it is necessary to consider the behavior of the canopy gores in abruptly reversing the angle of attack both on collapsing and on re-opening so that stalling is avoided. As has been seen above, the inner ring 24 becomes taut when the canopy inflates, thus holding all of the edges A inwardly of edges C, making air spill from the edges C of each gore. When the canopy is fully inflated, the gore mouth defined by the end B bulges outward. As the shrouds wind up, they pull inwardly on each end B, thus decreasing the angle of attack of the gore relative to the nearby air stream. As the shroud lines continue to wind up, the critical point is reached at which the gore mouth reaches the condition of zero outward lift. As the winding continues further, the lift goes negative and forces the gore mouth inward. The end B normally goes slack and rapidly collapses inward until it again becomes taut in the concave position. The result is a new equilibrium position with the gore mouth curvature reversed and the edges A blown outward of edges C in the area described below, in such manner that the canopy is caused to rotate in the opposite direction. In this squidded condition of the canopy the air intake area is greatly reduced, as is also the canopy radius, and in this condition the parachute rotates in the reverse direction only slowly. The drag is greatly decreased, however, so that the terminal velocity of the parachute system is greatly increased and the system on collapse drops rapidly downward with the advantages described above.

In the squidded condition a point of inflexion occurs some distance back from the mouth of each gore. Aft of this point (i. e. toward the vent 13) the gore bulges normally outward. Forward of this point the aerodynamic lift is directed inward, so the fabric is concave and is supported in equilibrium at some small radius by means of its own boundary tapes which are stretched between the shroud ends and the larger inflated portion aft of the inflexion point. When the shrouds unwind the angle they make with the parachute axis decreases. This gradually reduces the inward tilt of each gore mouth until it almost lines up with the local diverging airstream. At the critical re-open point the inward lift reaches zero and as the shrouds proceed to unwind it changes to outward lift. The fabric curvature changes abruptly from inward to outward and the canopy inflates to a new and much larger radius, depending largely on the gore and shroud length, the divergence of the airflow, and on how much slack fabric is available to bulge outward at the gore mouth. The fabric curvature changes abruptly because the canopy cannot normally find equilbrium in the region between the inflated and squidded condition by reason of the fact that the gore mouth normally has some slack and moves farther at the slightest stimulus until the slack is again used up by curvature in the opposite sense.

As mentioned above, the shroud lines are so connected to the stirrup 18 that in the squidded condition they pull on the edges C, so that these edges are pulled inwardly. Thus in the rear portion of the canopy, that is, the portion between the point of inflexion and the ring 13, the gores are slanted in the opposite direction to that in which the gores are slanted when the canopy is inflated. In this squidded condition the inner ring 24 is slack and has no effect. When the canopy suddenly fully inflates the gores all move outward. The slack edge A of each gore is restrained as soon as the inner ring becomes tight, so that as the free edges C continue outward, the effective tilt on the vanes is reversed. The dimensions of each part are such that almost the whole of each gore now assumes an efficient shape for high speed rotation in the opposite sense to that in the squidded case. This cyclic action repeats until the load approaches the parachute speed, so that the rotating load unwinds the shrouds too fast for them to collapse the canopy or until contact with the earth occurs.

Parachutes according to the invention are designed to perform in one of the modes referred to above, depending on the particular need which they are to fulfill. As mentioned above, the number of shroud line twists required to cause collapse is controlled by a large number of important variables, which for a given load inertia must be adjusted to insure that the parachute will perform as desired. For cyclic operation the length of the inner ring should be such that it changes from slack to tight or vice versa only during the unstable part of the cycle, otherwise the canopy may stall and cease to cycle. It has been found accordingly that the diameter of the inner ring should be about one-quarter of the flat diameter of the canopy. To obtain a good crisp cycle in which the drag on re-open is almost as large as in the first open phase, it is wise to design for an untwisted (or free) shroud length at collapse of about 37 percent of the canopy diameter (when laid out flat) and a free shroud length at re-open of about 100 percent of the canopy diameter. These shroud lengths can be controlled together by controlling the effective porosity of the canopy. The ratio between them can be controlled by varying the gore mouth slack. Effective porosity can be changed by varying the vent area or, more conveniently, the width of the slots near the inner ends. Gore mouth slack may be controlled by varying the amount of shirring at the mouth. Fabric porosity near to that allowing an airflow velocity of 6 ft./second with a pressure drop of 10 inches of water is recommended. Large variations in porosity can be used successfully if the slot width and gore mouth slack are adjusted to provide the proper shroud lengths as defined above. To obtain a suitably slow rotation in the squidding phase it is recommended that the slot edges, plus sides of stirrup 18, differ in length by approximately 1 percent of the canopy diameter when laid out flat.

Control over the length of the parts of the cycle is best effected by varying the number or diameter of the shrouds. At the higher forward speeds slightly more free shroud line is required for the critical collapse and re-open cases. For reliability enough shroud length should be provided so that open and re-open can take place at the highest speeds to be encountered with a few twists to spare in the shrouds. An overall shroud length of about 1.7×the diameter of the canopy (flat) is recommended. If the length of the shroud supplied is too great, it will cause the canopy to remain open too long, thus wasting valuable time.

As in the case of the known parachutes, no complete and reliable theories exist for predicting the exact performance of a parachute according to the invention, and even the experienced parachute designer must rely ultimately on flight tests from which to derive the information necessary to complete a parachute which will perform in the manner desired. Where a large enough wind tunnel is available it is preferred that a parachute according to the invention be tested in such a wind tunnel because of the effect which changes in speed have on certain characteristics of the parachute due partly to stretching. It is possible, however, to test new designs by low speed towing with a fast automobile equipped with an outrigger and then successfully to drop the parachutes so tested at high speed. In either case the parachute is attached to a fly wheel provided with low friction bearings and a spring scale calibrated to make possible a recording of drag and torque by means of motion picture cameras which also record the behaviour of the fly wheel, the parachute, a timing light and an anemometer. The fly wheel inertia is chosen on the basis of the load for which the parachute is being designed and from the results of the tests most of the fundamental parameters required to calculate a drop are obtained.

An example of the testing of a parachute by towing at low speeds and subsequently dropping it successfully at high speed without calculating the rotary behaviour is as follows:

Assuming a single collapse is required the new parachute is towed at a speed above the critical Reynolds number range. (Often 80 ft. per second is sufficient.) The drag D, the velocity V and the air distance S from release to reopen are recorded. This distance S normally is quite similar to that obtained in a drop. It is therefore fitted to a trajectory calculated and plotted for a terminal velocity obtained from the formula $$V_t^2 = W \frac{V^2}{D}$$

where $V_t$ = the terminal velocity
$W$ = the weight of the load

The probable fall before the re-opening occurs is thus obtained. The required height of release is then estimated by adding a generous 400 or 500 feet to allow the system to slow down before landing. The parachute is then connected to a dummy load and dropped from an aircraft at this estimated height. The drop is recorded by Kine Theodolite so that the height and velocity at all times can be calculated. When this is done a new release height can be chosen which yields a suitable landing velocity as soon as possible after re-open. This height should be checked in several drops and applied to all parachutes made to this design. Experience has shown that the repeatability of performance should be within ±50 feet when a reasonable amount of care is taken to ensure that the important parachute specifications are accurate.

Parachutes according to the invention designed to collapse at least once have been used on loads varying from 70 to 300 pounds and have been released at aircraft speeds from 130 to 250 knots. Terminal velocities (inflated) from 85 to 180 feet per second have been used. Designs suitable for single collapse dropping in accordance with the second mode from as low as 800 feet and as high as 2,500 feet have been successful. In one case it was found that limiting the ratio of load inertia to load mass had the effect of limiting the terminal velocity to a value above 100 feet per second for a short single cycle. This limit caused no practical difficulty because landing above this speed is desirable where accuracy is required. The characteristics of a parachute according to the invention tested for behaviour in the single collapse mode, are shown in the following table:

EXAMPLE OF PARACHUTE BEHAVIOUR

*Single collapse mode*

| Characteristics | | Ref. No. in Drawings |
|---|---|---|
| Mid slot strap, length | 8" | 21 |
| Inner slot strap, length | 7" | 20 |
| Inner ring circumference | 67" | 24 |
| Vent diameter | 5" | 13 |
| Difference in effective length of gore sides (gore sides plus stirrup 18) | ¾" | C−A+18 |
| Shroud length | 125" | 15 |
| Shroud diameter | 0.136" | 15 |
| Shroud number | 48 | 15 |
| Canopy diameter (flat) | 80" | |
| Slot edge shirring | 10% | 10 |
| Gore mouth shirring | 28% | B |
| Gore material | Nylon | |
| Gore material porosity (at 10" H₂O) | 5 | |
| Canopy pitch (average for first open phase at low speed) | .28 ra./ft | |
| Approximate percent slots+vent area* | 24% | |
| Weight of the load | 302.5 lbs | |
| Length of the load | 90.8 in | |
| Moment of inertia of the load | 1.18 S. F.² | |
| Terminal velocity | 125 F./S | |

*Projected on a hemisphere having a radius equal to that of the inflated canopy.

Tests made at a release velocity of 420 feet per second resulted in collapse after a fall of 135 feet and re-open after a total fall of 680 feet. For a recommended height of release of 1087 feet the throw was 1500 feet, the time of fall was 10.8 seconds, the maximum velocity was 186 F./S. and the landing velocity was 125 F./S.

This parachute may be caused to perform in a different mode by altering the characteristics set forth above. Thus, for example, it may be caused to perform in the "no collapse" mode by altering the load weight and moment of inertia, suitable values being respectively 200 lbs. and 0.8 S. F.$^2$. Similarly this parachute may be caused to perform in the "multiple collapse" mode by altering the load weight and moment of inertia, suitable values being respectively 450 lbs. and 1.8 S. F.$^2$.

It will be understood that the parachute according to the invention is not limited in its application to the dropping of objects. It may also be used, for example, as a landing brake for aircraft, having the great advantage in this field that if an aircraft preparing to land with the aid of a parachute according to the invention should find it necessary to make another approach, the canopy can be quickly collapsed and re-opened when desired or perhaps retrieved and released again. In such an application the shroud lines must be so connected to the load (the aircraft) that torque is not transmitted to the load while the parachute serves as a brake, but is transmitted (e. g. by blocking a swivel connection) when it is desired to collapse the canopy.

What I claim as my invention is:

1. A parachute for inanimate objects comprising a canopy, a plurality of shroud line units each connected at one end to the canopy, means for connecting the other end of each shroud line unit to a load, said means being adapted to transmit to the load such torque as is developed at the load end of the shroud lines and said canopy being formed of a plurality of gores each tapering from an outer end at the mouth of the canopy toward the top centre of the canopy, the gores being spaced from adjacent gores at the mouth of the canopy and substantially throughout their length to define correspondingly tapered slots between said gores, a junction member arranged centrally of the canopy to which the inner end of each gore is attached, at least one flexible relatively inexpansible strap member spanning the gap between adjacent gores intermediate their ends and interconnecting adjacent edges of adjacent gores, and means adapted when the canopy is in flight to tilt said gores spaced from adjacent gores whereby in flight air trapped by the canopy passes tangentially through said slots and the canopy is rotated in a direction depending on the tilting of said gores.

2. A parachute for inanimate objects as claimed in claim 1 comprising stirrup means connected to each shroud line unit and to adjacent ends of the outer edges of adjacent gores, the distance from the point of connection of said means to the shroud line unit measured along said means and the sides of adjacent gores to the top centre of the canopy being different whereby one side of each gore is taut while the adjacent side of the next gore is slack when the canopy is in the collapsed condition in flight, said means adapted when the canopy is in flight to tilt said gores comprising means adapted, when the canopy is in the fully inflated condition to hold those gore sides which are slack in the collapsed condition inwardly of the other gore sides, whereby in flight the canopy rotates in one direction in the fully inflated condition and rotates in the reverse direction in the collapsed condition.

3. A parachute for inanimate objects as claimed in claim 2 wherein said means for holding inwardly the sides which in the collapsed condition in flight are slack comprises a ring of material positioned to the underside of the canopy, and means in connection with each of such sides engaging said ring, said ring being adjustable in length to vary the pitch of the gores when the canopy is in fully inflated condition in flight.

4. A parachute for inanimate objects as claimed in claim 2 wherein said means for holding inwardly the sides which in the collapsed condition in flight are slack comprises a ring of material positioned to the underside of the canopy, and means in connection with each of such sides engaging said ring.

5. A parachute for inanimate objects as claimed in claim 4 comprising a loop of material connected to each of the gore sides which in the collapsed condition in flight is slack, said ring extending loosely through each of said loops.

6. A parachute for inanimate objects as claimed in claim 5 wherein said difference in distance from the point of connection of said shroud line units to the top centre of the canopy is approximately 1% of the diameter of the canopy measured laid out flat.

7. A parachute for inanimate objects as claimed in claim 5 wherein said loops are connected to each of such sides about two-thirds of the way inwardly from the outer end of each gore.

8. A parachute for inanimate objects as claimed in claim 5 wherein said loops are connected to each of said sides about two-thirds of the way inwardly from the outer end of each gore, and said ring is adjustable in length to vary the pitch of the gores when the canopy is in fully inflated condition in flight.

9. A parachute for inanimate objects as claimed in claim 5 wherein said loops are connected to each of said sides about two-thirds of the way inwardly from the outer end of each gore and said ring is adjustable in length to vary the pitch of the gores when the canopy is in fully inflated condition in flight, the ring being of a diameter about equal to one-quarter of the flat diameter of the canopy.

10. A parachute for inanimate objects as claimed in claim 5 wherein each gore comprises fabric folded along each outer and side edge to define a channel, and a reinforcing tape in each said channel sewn to the canopy at intervals, with the fabric of the gore shirred, said reinforcing tape extending as one unit along the other side, and the two free ends being secured to the corresponding free ends of a diagonally opposite gore of the canopy.

11. A parachute for inanimate objects as claimed in claim 10 wherein said stirrup means connecting a shroud line unit to each end of the outer edge of a gore is connected to said reinforcing tape.

References Cited in the file of this patent

UNITED STATES PATENTS

| | | |
|---|---|---|
| 966,143 | Van Wie | Aug. 2, 1910 |
| 2,384,416 | Derry | Sept. 4, 1945 |
| 2,469,573 | Quilter | May 10, 1949 |
| 2,701,697 | Ewing | Feb. 8, 1955 |
| 2,724,567 | Adams | Nov. 22, 1955 |

FOREIGN PATENTS

| | | |
|---|---|---|
| 680,483 | Germany | Aug. 30, 1939 |
| 933,149 | France | Dec. 17, 1947 |
| 974,099 | France | Sept. 27, 1950 |